(12) United States Patent
Bai et al.

(10) Patent No.: US 6,464,609 B1
(45) Date of Patent: Oct. 15, 2002

(54) HYDRAULIC CONTROL FOR A SIX-SPEED AUTOMATIC TRANSMISSION

(75) Inventors: Shushan Bai; Robert Lowell Moses, both of Ann Arbor, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/834,858

(22) Filed: Apr. 16, 2001

(51) Int. Cl.$^7$ .............................................. F16H 61/06

(52) U.S. Cl. ..................... 475/116; 475/127; 475/128

(58) Field of Search ................................ 475/116, 127, 475/128

(56) References Cited

U.S. PATENT DOCUMENTS

| | | | | |
|---|---|---|---|---|
| 3,868,866 A | * | 3/1975 | Lentz .......................... | 475/116 |
| 5,106,352 A | | 4/1992 | Lepelletier .................. | 475/280 |
| 5,601,506 A | | 2/1997 | Long et al. ................. | 475/120 |
| 5,616,093 A | | 4/1997 | Long et al. ................. | 475/120 |
| 5,643,125 A | | 7/1997 | Long et al. ................. | 475/127 |
| 5,685,408 A | | 11/1997 | Long ......................... | 192/3.58 |
| 5,725,451 A | * | 3/1998 | Tsukamoto et al. ......... | 475/128 |
| 6,077,182 A | * | 6/2000 | Long et al. ................. | 475/128 |
| 6,319,164 B1 | * | 11/2001 | Runde et al. ............... | 475/116 |

OTHER PUBLICATIONS

USSN 09/524,594 filed Mar. 14, 2000.

* cited by examiner

Primary Examiner—Sherry Estremsky
(74) Attorney, Agent, or Firm—Leslie C. Hodges

(57) ABSTRACT

An electro-hydraulic control for a six speed power transmission has three shift control valves that are each actuated by a spring and a solenoid valve. The shift valves are positioned in either a spring set or a pressure set position to establish flow paths to five torque transmitting mechanisms (friction devices) that are engaged according to a predetermined schedule to establish six forward speed ratios and one reverse ratio. A pair of high ratio control valves and a pair of low ratio control valves operate to control the actuation pressures for the friction devices. The actuation pressures are distributed through a switching valve. The high ratio control valves control the on coming friction device with an increasing pressure schedule while the low ratio control valves control the off going friction device with a decreasing pressure schedule. A bias port on each of the low ratio valves is responsive to the pressure output of the high ratio control valve to discontinue operation of the low ratio control valve when the on coming friction device has sufficient capacity to transmit the torque. During downshifting, a down shift valve is operable to prevent the pressure of the high ratio control valve from acting on the bias ports. An exhaust switch valve cooperates with the switching valve to ensure that the proper pressure is distributed to the friction devices following an up shift or a down shift.

7 Claims, 3 Drawing Sheets

| Transition State | | | Solenoids | | | | | Pressure SW | | Clutches | | | | | | Shift in Progress ? |
|---|---|---|---|---|---|---|---|---|---|---|---|---|---|---|---|---|
| Gear Select | Command Gear | 84 | 88 | 92 | 114 | 128 | PS 1* | PS 2* | C1 | B2 | C2 | C3 | B1 Apply | B1 Reduce | |
| Park | Neutral | 0 | 1 | 0 | 1 | 0 | c | c | exh | exh | exh | exh | line | exh | |
| Reverse | Reverse | 0 | 1 | 0 | 1 | 0 | c | c | exh | exh | $P_{rev}$ | exh | line | exh | |
| Neutral | Neutral | 0 | 1 | 0 | 1 | 0 | c | c | exh | exh | exh | exh | line | exh | |
| DRive | N-1 (1st) | 0 | 1 | 0 | 1 | 0 | o | c | $P_{hi1}$ | exh | exh | exh | line | Drive | y |
| | 1-2 (1st) | 0 | 0 | 0 | 1 | 0 | o | o | Drive | $P_{low2}$ | $P_{hi1}=0$ | exh | exh | Drive | y |
| | 2-1 (1st) | 0 | 0 | 0 | 1 | 1 | c | c | Drive | $P_{low2}$ | $P_{hi1}=0$ | exh | exh | Drive | y |
| | 1-3 (3rd) | 0 | 0 | 0 | 1 | 0 | o | c | Drive | $P_{low2}=0$ | $P_{hi1}$ | exh | exh | Drive | y |
| | 3-1 (1st) | 0 | 0 | 0 | 1 | 1 | c | c | Drive | $P_{low2}=0$ | $P_{hi1}$ | exh | exh | Drive | y |
| | 2-3 (3rd) | 0 | 0 | 0 | 1 | 0 | o | c | Drive | $P_{low2}$ | $P_{hi1}$ | exh | exh | Drive | y |
| | 3-2 (2nd) | 0 | 0 | 0 | 1 | 1 | c | o | Drive | $P_{low2}$ | $P_{hi1}$ | exh | exh | Drive | y |
| | 2-4 (4th) | 0 | 0 | 1 | 1 | 0 | o | c | Drive | $P_{low2}$ | exh | $P_{hi1}$ | exh | Drive | y |
| | 4-2 (2nd) | 0 | 0 | 1 | 1 | 1 | c | o | Drive | $P_{low2}$ | exh | $P_{hi1}$ | exh | Drive | y |
| | 3-4 (4th) | 0 | 1 | 1 | 1 | 0 | o | c | Drive | exh | Drive | $P_{hi1}$ | exh | Drive | y |
| | 4-3 (3rd) | 0 | 1 | 1 | 1 | 1 | c | o | Drive | exh | Drive | $P_{hi1}$ | exh | Drive | y |
| | 3-5 (5th) | 1 | 0 | 1 | 1 | 0 | o | c | $P_{low2}$ | exh | Drive | $P_{hi2}$ | exh | Drive | y |
| | 5-3 (3rd) | 1 | 0 | 1 | 1 | 1 | c | o | $P_{low2}$ | exh | Drive | $P_{hi2}$ | exh | Drive | y |
| | 4-5 (5th) | 1 | 0 | 0 | 1 | 0 | o | c | $P_{low1}$ | exh | $P_{hi1}$ | Drive | exh | Drive | y |
| | 5-4 (4th) | 1 | 0 | 0 | 1 | 1 | c | o | $P_{low1}$ | exh | $P_{hi1}$ | Drive | exh | Drive | y |
| | 4-6 (6th) | 1 | 1 | 0 | 1 | 0 | o | c | $P_{low1}$ | $P_{hi1}$ | exh | Drive | exh | Drive | y |
| | 6-4 (4th) | 1 | 1 | 0 | 1 | 1 | c | o | $P_{low1}$ | $P_{hi1}$ | exh | Drive | exh | Drive | y |
| | 5-6 (6th) | 1 | 1 | 1 | 1 | 0 | o | c | exh | $P_{hi1}$ | $P_{low1}$ | Drive | exh | Drive | y |
| | 6-5 (5th) | 1 | 1 | 1 | 1 | 1 | c | o | exh | $P_{hi1}$ | $P_{low1}$ | Drive | exh | Drive | y |

* = Pressure switch states (normally closed) are at the end of the shift (ratio change) for a shift in progress and at the beginning of the shift for Steady State
1 = Pressure set         c = Closed switch
2 = Spring set           o = Open Switch
exh = clutch is either exhausted or connected to back fill pressure

FIG. 3

HYDRAULIC CONTROL FOR A SIX-SPEED AUTOMATIC TRANSMISSION

TECHNICAL FIELD

This invention relates to transmission controls for a power transmission.

BACKGROUND OF THE INVENTION

Power transmissions of the automatic shifting type have a plurality of selectively establishable gear ratios between the engine and ground engaging mechanism for the vehicle. The ratios are generally established by hydraulically operated friction devices such as clutches and brakes. The engagement and disengagement of these friction devices are controlled by valve mechanisms which direct hydraulic fluid to and from the operating piston of the devices.

Some transmission control systems have incorporated electrohydraulic control systems with "clutch to clutch" shift technology. The control systems have utilized two strategies, open loop control and closed loop control. During open loop control, the on-coming friction torque transmitting mechanism (clutch or brake) is filled with fluid and the pressure is ramped up to the inertial pressure required during the shift. The release timing of the pressure in the off-going friction torque transmitting mechanism is based on an estimation of the oncoming torque transmitting mechanism fill time. The fill time of the oncoming torque transmitting mechanism varies due to many design and assembly factors such that the release of the off-going torque transmitting mechanism can be early, causing a flare, or late, causing a tie-up. Some control algorithms have been developed to detect the oncoming clutch fill using an input or output speed signal. However, these have not proved reliable for practical use.

During closed loop control, the off-going torque transmitting mechanism capacity is reduced to its critical point by generating a predetermined slip speed in the off-going torque transmitting mechanism. The oncoming torque transmitting mechanism is filled and ramped up to the inertial pressure. As the oncoming torque transmitting mechanism gains capacity, the input speed will drop. As the input speed drop is detected by the microprocessor, the off-going torque transmitting mechanism capacity is reduced to zero. In the closed loop control, there is a controlled engine flare at the beginning of the interchange causing an output torque dip. Also since the off-going torque transmitting mechanism is not released until the input speed drop is detected, a tie-up is present during the ratio interchange.

SUMMARY OF THE INVENTION

The present invention provides a transmission control system for a six speed automatic transmission. The control system provides clutch-to-clutch shift control with new features to improve robustness and failure mode.

The system minimizes the number of components while still ensuring the transmission is protected against any combination of actuator interruption.

The control system includes four pressure control valves, two low pressure ratios and two high pressure ratios. During an upshift transition, a switch valve directs an increasing pressure from a high ratio control valve to the on-coming friction device and a decreasing pressure from a low ratio control valve to the off-going clutch. A downshift valve is disposed in the circuit to direct the oncoming pressure to a bias port on the low ratio control valve to discontinue operation of the low ratio control valve and exhaust the of-going friction device. When the shift transition is complete, the switch valve directs fixed pressure to the engaged friction devices.

During a downshift, the downshift valve prevents the bias from the high ratio control valve, controlling the off-going friction device, from affecting the pressure output of the low ratio control valve which is controlling the on-coming friction device. An exhaust switching valve is provided to cooperate with the switch valve to insure that the proper friction device is pressurized and that the proper friction device is exhausted. During an up shift, the oncoming device (high ratio friction device) is maintained with a system pressure, and the off-going device (low ratio friction device) is supplied with a low (approx. 2 psi) fluid pressure. During a down shift, the opposite pressure schedule is required. The exhaust switching valve ensures that this will occur.

BRIEF DESCRIPTION OF THE DRAWINGS

FIG. 3 is a table summarizing the torque transmitting mechanism engagement schedule and valve operation of a transmission control system incorporating the present invention.

DESCRIPTION OF THE PREFERRED EMBODIMENT

Figure 1:
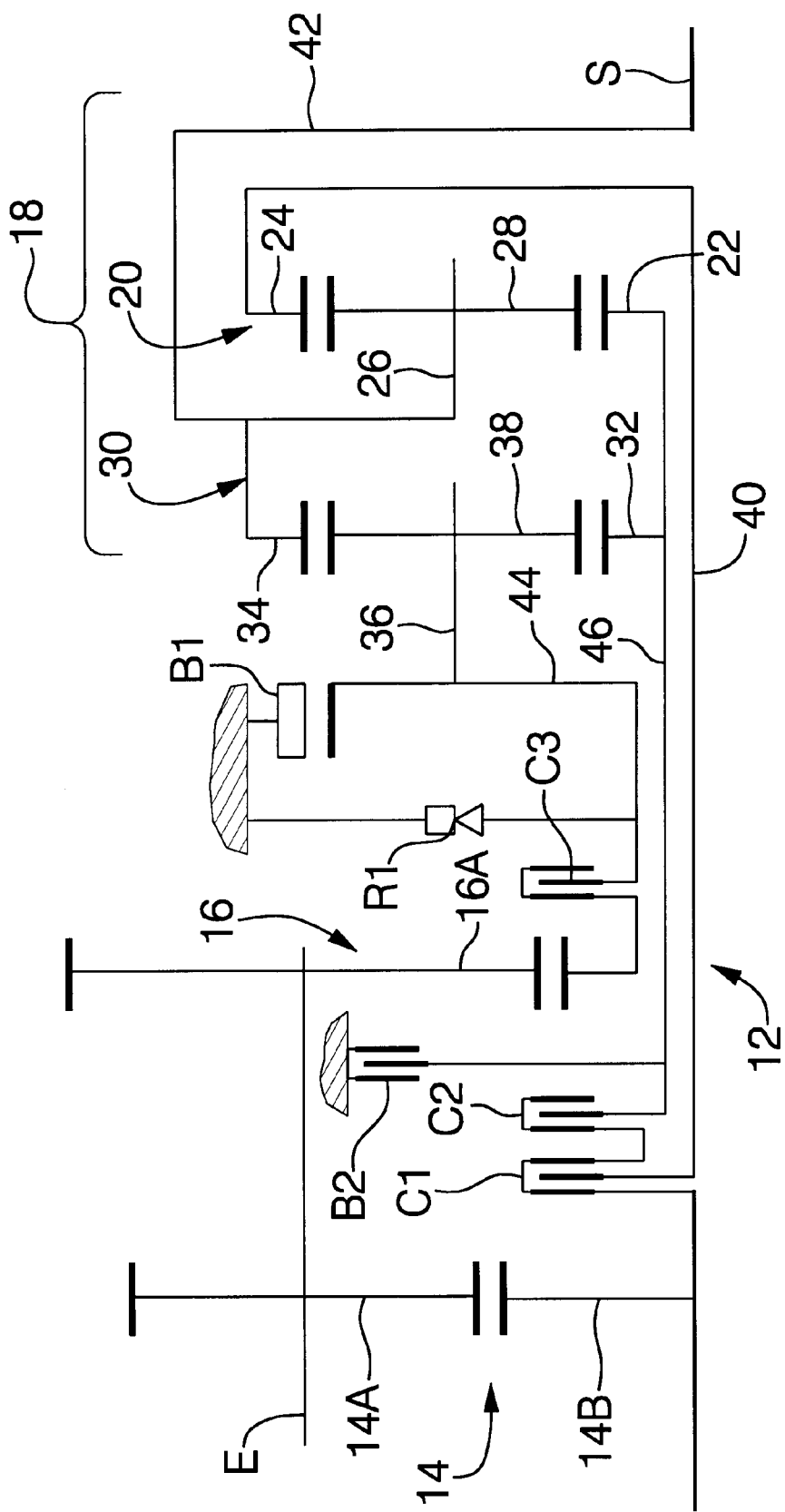
FIG. 1 is a schematic representation of a powertrain compatible with the present invention transmission control system.

A transmission 10 is shown in FIG. 1 and includes an input shaft E connected to receive torque from an engine, not shown, an output shaft S connected to deliver torque to the drive wheels, not shown, and a multi-speed planetary gear arrangement 12 operatively connected therebetween. The planetary gear arrangement 12 described is just one of those shown in U.S. Pat. No. 5,106,352 issued to Lepelletier.

The planetary gear arrangement 12 includes five conventional fluid-operated friction devices, three being illustrated and designated as clutches: C1, C2, and C3, and two as brakes: B1 and B2, which are well known in the art. The brakes are depicted schematically as band type brakes, however, it is well known to utilize a disc type friction brake in place of a band brake in the transmission art.

The planetary gear arrangement 12 has a first gearset 14 including a gear 14*a* fixed to the input shaft E and a gear 14*b* in constant meshing engagement with gear 14*a* and connected to the first control clutch C1 and the second control clutch C2.

A second gearset 16 includes a gear 16*a* fixed to the input shaft E and a gear 16*b* in constant meshing engagement with gear 16*a* and connected to the third control clutch C3.

A double planetary gearset 18 has a first gearset 20 including a sun gear 22, a ring gear 24 and a planet carrier assembly 26. The planetary carrier assembly 26 includes a plurality of single pinions 28 rotatably mounted thereon and meshing with the sun gear 22 and the ring gear 24. The double gearset 18 has a second gearset 30 including a sun gear 32, a ring gear 34 and a planet carrier assembly 36. The planetary carrier assembly 36 includes a plurality of single pinions 38 rotatably mounted thereon and meshing with the sun gear 32 and the ring gear 34.

A one-way mechanism R1 is arranged in parallel with the first control brake B1 to facilitate transitions between first and second gear in a manner known in the art.

The planetary gear arrangement further includes four rotatable members referred to as 40, 42, 44, and 46. First member 40 is associated with the first control clutch C1 and the ring gear 24. Second member 42 is formed by the planet carrier 26 of the gearset 20, fixed for rotation with the ring gear 34 of the gearset 30 and the output shaft S. The third member 44 is associated with the planet carrier 36 of the gearset 30, the third control clutch C3, the one-way mechanism R1, and the first control brake B1. The fourth member 46 is associated with the sun gears 22 and 32 of the gear sets 20 and 30 and fixed for rotation with each other, and with the second control clutch C2 and the second control brake B2.

The planetary gear arrangement 12 provides six forward speed ratios and one reverse transmission ratio with the appropriate pair of friction devices engaged as charted in FIG. 3. The first forward speed ratio is provided with the actuation of first control clutch C1 and first control brake B1. The first member 40 is driven and the third member 44 is held against rotation.

The second forward drive ratio is established by disengaging first control brake B1 and engaging second control brake B2, while the clutch C1 remains engaged. The first member 40 is driven and the fourth member 46 is held against rotation.

The third forward drive ratio is established by disengaging second control brake B2 while engaging the second control clutch C2 and maintaining the clutch C1 engaged. The first and fourth members 40 and 46 and the double planetary gearset 18 are driven as a unit.

The fourth forward drive ratio is established by releasing second control clutch C2, engaging the third control clutch C3, while maintaining the first control clutch C1 engaged. The first and third members 40 and 44 are driven.

The fifth drive ratio is provided by engaging second control clutch C2 while disengaging first control clutch C1 and maintaining third control clutch C3 engaged. The third and fourth members 44 and 46 are driven.

The sixth drive ratio is provided by engaging the second control brake B2 and maintaining the third control clutch C3 engaged, while disengaging the second control clutch C2. This transmits torque through the third member 44 while holding the fourth member 46 against rotation.

A reverse drive ratio is provided through the engagement of the second control clutch C2 and the first control brake B1. The fourth member 46 is driven while the third member 44 is held stationary.

Figure 2:
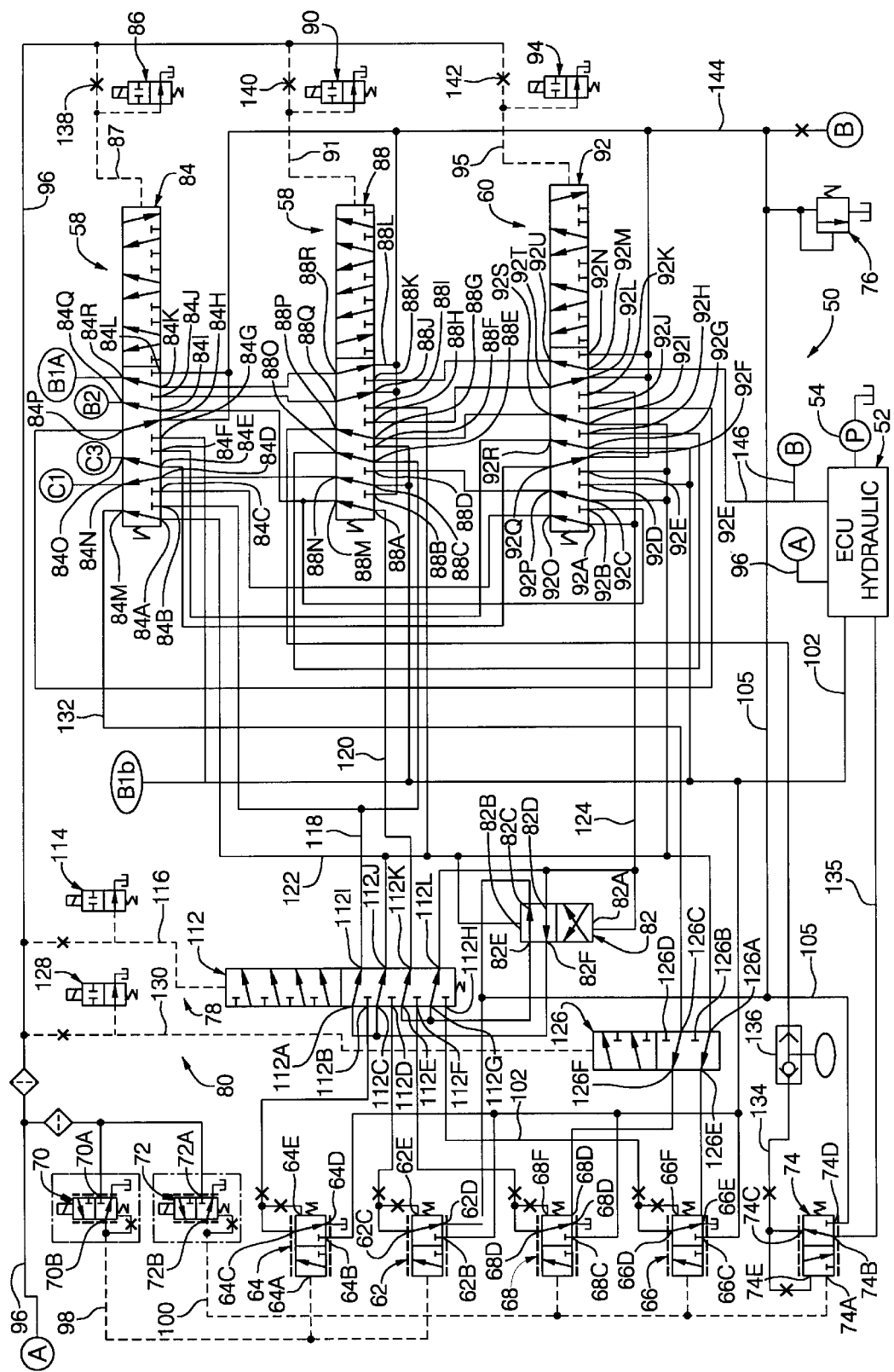
FIG. 2 is a diagrammatic representation depicting a transmission control system incorporating the present invention.

The engagement and disengagement of the fluid-operated friction devices are controlled through an electro-hydraulic control system 50 of the present invention, diagrammed schematically in FIG. 2.

The electro-hydraulic control system 50 includes a pump 54 to supply hydraulic fluid to an electro-hydraulic control 52. The electro-hydraulic control 52 incorporates an electronic control module (ECU) that includes a conventional preprogrammed digital computer and hydraulic devices (HYDRAULIC) including conventional pressure control valves and conventional directional valves such as a manual valve.

The electro-hydraulic control system 50 also includes three shift logic valves 56, 58, and 60, two high ratio control valves 62 and 64, two low ratio control valves 66 and 68, two pressure control valves 70 and 72, a reverse control valve 74, and a backfill pressure regulator valve 76. The control system 50 further includes a steady state/transition switch logic valve 78 (referred to as S/T switch valve), a downshift valve 80, and a drive/exhaust switch valve 82 (referred to as D5/ex valve).

The shift logic valve 56 is comprised of a shift valve 84 and a control valve 86. The control valve 86 is a conventional off-on type solenoid valve controlled by the ECU. The shift valve 84 is a directional flow control valve having twelve ports 84A, 84B, 84C, 84D, 84E, 84F, 84G, 84H, 84I, 84J, 84K, and 84L, which are selectively connectable with six ports 84M, 84N, 84O, 84P, 84Q, and 84R. In the spring set position shown, the ports 84B, 84C, 84F, 84G, 84J, 84L are blocked; the port 84A is connected to 84M, the port 84D is connected to 84N, the port 84E is connected to 84O, the port 84H is connected to 84P, the port 84I is connected to 84Q, and the port 84K is connected to 84R. In the pressure set position, that is when the control valve 86 is energized by the ECU to control the fluid pressure delivered through a passage 87 to the shift valve 84, the ports 84A, 84D, 84E, 84H, 84I, and 84K are blocked, while the ports 84B, 84C, 84F, 84G, 84J, and 84L are connected to the ports 84M, 84N, 84O, 84P, 84Q, and 84R respectively.

The shift logic valve 58 is comprised of a shift valve 88 and a control valve 90 which are interconnected by a passage 91. The pressure in the passage 91 is controlled by the control valve 90, which is an off-on type solenoid valve controlled by the ECU. The shift valve 88 has a spring set position shown and a pressure set position which is achieved when the passage 91 is pressurized. The shift valve 88 has twelve ports 88A, 88B, 88C, 88D, 88E, 88F, 88G, 88H, 88I, 88J, 88K, and 88L, which are selectively connectable with six ports 88M, 88N, 88O, 88P, 88Q, and 88R. In the spring set position shown, the ports 88A, 88C, 88E, 88G, 88J, and 88L are connected with the ports 88M, 88N, 88O, 88P, 88Q, and 88R respectively, while the ports 88B, 88D, 88F, 88H, 88I, and 88K are blocked. In the pressure set position, the ports 88B, 88D, 88F, 88H, 88I, and 88K are connected with the ports 88M, 88N, 88O, 88P, 88Q, and 88R respectively, while the ports 88A, 88C, 88E, 88G, 88J, and 88L are blocked.

The shift logic valve 60 is comprised of a shift valve 92 and a control valve 94, which are interconnected by a passage 95. The pressure in the passage 95 is controlled by the control valve 94 which is an off-on type solenoid valve controlled by the ECU. The shift valve 92 has fourteen ports 92A, 92B, 92C, 92D, 92E, 92F, 92G, 92H, 92I, 92J, 92K, 92L, 92M, and 92N, which are selectively connectable with seven ports 92O, 92P, 92Q, 92R, 92S, 92T, 92U, and 92V. In the spring set position shown, the ports 92A, 92C, 92F, 92G, 92I, 92L, and 92M are connected with the ports 92O, 92P, 92Q, 92R, 92S, 92T, and 92U respectively, while the ports 92B, 92D, 92E, 92H, 92J, 92K, and 92N are blocked. In the pressure set position, the ports 92B, 92D, 92E, 92H, 92J, 92K and 92N are connected with the ports 92O, 92P, 92Q, 92R, 92S, 92T, and 92U respectively, while the ports 92A, 92C, 92F, 92G, 92I, 92L and 92M are blocked.

The pressure control valve 70 is a variable pressure type solenoid valve that is controlled in a well-known manner by the ECU. The valve 70 may be of the pulse width modulated (pwm) type which has an output pressure proportional to the voltage duty cycle imposed on the solenoid by the ECU. The valve 70 has an inlet port 70A connected with a passage 96 that is supplied with a constant pressure from the control 52. The passage 96 also supplies fluid to the solenoids for the control valves 86, 90, and 94. The pressure control valve 70 has an outlet port 70B that is connected with a passage 98 which in turn is connected with control ports 62A and 64A of the high ratio control valves 62 and 64, respectively.

The pressure control valve 72 is a variable pressure type solenoid valve that is controlled in a well-known manner by the ECU. The valve 72 may be of the pwm type. The valve 72 has an inlet port 72A connected with the passage 96. The valve 72 has an outlet port 72B that is connected with a passage 100 which in turn is connected with control ports 66A and 68A of the low ratio control valves 66 and 68, respectively as well as a control port 74A of the reverse control valve 74.

The high ratio control valve 62 has an inlet port 62B, an outlet port 62C, an exhaust port 62D and a feedback control port 62E. The inlet control port 62B is connected with a passage 102 that is supplied with pressurized fluid by the control 52 whenever the driver selects a drive position with the manual valve. The pressure in the outlet port 62C is proportional to the pressure in the passage 98 which is provided from the pressure control valve 70. The outlet port 62C is connected with the feedback control port 62E and a passage 104 to the S/T switch logic valve 78. The exhaust port 62D is connected with a passage 105 to the D5/EX SW VALVE 82.

The high ratio control valve 64 had an inlet port 64B, an outlet port 64C, an exhaust port 64D and a feedback control port 64E. The inlet control port 64B is connected with the passage 102 that is supplied with pressurized fluid by the control 52 whenever the driver selects a drive position with the manual valve. The pressure in the outlet port 64C is proportional to the pressure in the passage 98 which is provided from the pressure control valve 70. The outlet port 64C is connected with the feedback control port 64E and a passage 106 that is in turn connected with the S/T switch logic valve 78.

The low ratio control valve 66 has an inlet port 66C, an outlet port 66D, an exhaust port 66E and a feedback control port 66F. The inlet port 66C is connected with the passage 102. The outlet port 66D is connected with a passage 108 which is also connected with the feedback control port 66F. The pressure in the passage 108 is proportional to the pressure in the passage 100 which is controlled by the pressure control valve 72.

The low ratio control valve 68 has an inlet port 68C, an outlet port 68D, an exhaust port 68E and a feedback control port 68F. The inlet port 68C is connected with the passage 102. The outlet port 68D is connected with a passage 110 which is also connected with the feedback control port 68F and the S/T switch logic valve 78. The pressure in the passage 110 is proportional to the pressure in the passage 100 which is controlled by the pressure control valve 72.

S/T SW VALVE

The S/T SW VALVE (switch logic) 78 is comprised of a switch valve 112 and a control valve 114. The control valve 114 is a conventional off-on type solenoid valve controlled by the ECU. During a steady state gear, the control valve 114 is off, whereas during a ratio interchange, the control valve is on. The shift valve 112 is a directional flow control valve having eight ports 112A, 112B, 112C, 112D, 112E, 112F, 112G, and 112H that are selectively connectable with four ports 112I, 112J, 112K, and 112L. In the spring set position shown, the ports 112A, 112C, 112E, and 112G are connected with the ports 112I, 112J, 112K, and 112L respectively, while the ports 112B, 112D, 112F, and 112H are blocked. In the pressure set position, that is when the control valve 114 is energized by the ECU to control the fluid pressure delivered through a passage 116 to the shift valve 112, the ports 112A, 112C, 112E, and 112G are blocked, while the ports 112B, 112D, 112F, and 112H are connected to the 112I, 112J, 112K, and 112L respectively. The passage 96 supplies fluid to the passage 116. The port 112B is connected to the high ratio control valve output port 64C by the passage 106. The port 112D is connected to the high ratio control valve output port 62C by the passage 104. The port 112F is connected to the low ratio control valve output port 68D by the passage 110. The port 112H is connected to the low ratio control valve output port 66D by the passage 108. The port 112I is connected to port 84B of the shift valve 84 and to port 88E of the shift valve 88 by a passage 118. The port 112K is connected to port 88A of the shift valve 88 by a passage 120. The port 112J is connected to a plurality of ports including port 84A of shift valve 84, port 88I of shift valve 88, and ports 92C, 92E, and 92I of shift valve 92, through a passage 122. The port 112L is connected to ports 92A and 92K of shift valve 92 by a passage 124. During any gear shifting, The S/T SW VALVE 112 will be at a pressure set position. When the new ratio is fully established, the valve will be switched to the spring set position.

D5/EX SW VALVE

D5/EX SW VALVE 82 has two control ports 82A and 82B. When the pressure at port 82B is higher than the pressure at port 82A the D5/EX SW VALVE 82 will be at lower position. At this position, the port 82F is connected to the port 82D which is connected to the drive pressure, the port 82E is connected to the port 82C which is connected to the 2 psi back fill pressure. When the pressure at port 82A is higher than the pressure at port 82B the D5/EX SW VALVE 82 will be at upper position. At this position, the port 82E is connected to the port 82D which is connected to the drive pressure, the port 82F is connected to the port 82C which is connected to the 2 psi back fill pressure. The pressure at port 82A and 82B are determined by the state of the low gear clutch pressure control valve 66 and high gear clutch pressure control valve 62 respectively, when the S/T SW VALVE 112 is at pressured position. After a upshift the output pressure of valve 62 will be high, and the output pressure of valve 66 will be low, therefore the pressure at port 82B will be higher than the pressure at port 82A. If the S/T SW VALVE 112 is switched to the spring position after a upshift, the D5/EX SW VALVE 82 will be latched at lower position. After a downshift the output pressure of valve 66 will be high and the output pressure of the valve 62 will be low, therefore the pressure at port 82A will be higher than the pressure at port 82B. If the S/T SW VALVE 112 is switched to the spring position after a downshift, the D5/EX SW VALVE 82 will be latched at upper position.

Downshift Valve

The downshift logic valve 80 is comprised of a downshift valve 126 and a control valve 128. The control valve 128 is a conventional off-on type solenoid valve controlled by the ECU. The control valve 128 is on during downshift ratio interchange. The downshift valve 126 is a directional flow control valve having four ports 126A, 126B, 126C, and 126D where 126B and 126D are deadheaded ports, that are selectively connectable with two ports 126E and 126F. In the spring set position shown, the ports 126A and 126C are connected with the ports 126E and 126F respectively, to connect passage 122 to port 66B and passage a 132 to port 68B for force exhausting of the off-going clutch. In the pressure set position, that is when the control valve 128 is energized by the ECU to control the fluid pressure delivered through a passage 130 to the downshift valve 126, the deadheaded ports 126B and 126D are connected to ports 126E and F respectively. Port 126A is connected to passage 122 and therefore to port 112J of S/T switch valve 112. Port 126C is connected to port 84M of switch valve 84 through the passage 132

The low ratio control valve 66 has a second control port 66B opposing control port 66A, which may receive fluid pressure from the high ratio control valve 62 through the S/T switch valve port 112J via passage 122, and through the downshift valve port 126E. When the output pressure of the high ratio control valve 62, and therefore port 66B, reach a predetermined level, equal to the critical capacity of the oncoming torque transmitting mechanism, the low ratio control valve 66 is exhausted through port 66E.

The low ratio control valve 68 has a second control port 68B opposing control port 68A, which may receive fluid pressure from the shift valve port 84M through passage 132 and through port 126C of the downshift valve 126. When the pressure at port 68B reaches a critical capacity for the on-coming clutch, the low ratio control valve 66 is exhausted through port 68E.

Back Fill Valve

When the feedback pressure at port 62E of high ratio valve 62 is greater than the pressure at the control port 62A, then fluid is exhausted through port 62D to passage 105. Passage 105 communicates with the back fill valve 76. The back fill valve 76 is a conventional regulator valve that maintains the pressure in the passage 105 and a passage 144 at a substantially fixed level. Thus the pressure at the port 62D has a minimum pressure as established by the back fill valve 76 which is generally set at approximately 2 psi. The pressure level in the passage 144 is sufficient to maintain the apply pistons in the torque transmitting mechanisms filled with hydraulic fluid to reduce the fill time needed during a ratio interchange. This is common practice with electro-hydraulic controls for automatic shifting transmissions.

Reverse Valve

The reverse valve 74 is a downstream regulator valve having a control port 74A, an inlet port 74B, an outlet port 74C, an exhaust port 74D, and a feedback control port 74E. The control port 74A connected with passage 100 which is supplied pressurized fluid by the pressure control valve 72, thereby exhausting the reverse valve when passage 100 is pressurized. The inlet port 74B is connected by a passage 135 to the control 52. Passage 135 is pressurized when the driver selects reverse on the manual valve. The outlet port 74C is connected with a passage 134 that is in turn connected with the port 88P of the shift valve 88. Exhaust port 74D is connected to passage 105 and therefore communicates with the back fill valve 76. The feedback port 74E limits the maximum reverse pressure.

Shuttle valve

Disposed in passage 134 is a shuttle valve 136 which operates to permit fluid flow from port 88P of shift valve 88 to the second clutch C2 when the pressure at port 88P is greater than the pressure at the output port 74C of the reverse valve 74 for $3^{rd}$ and $5^{th}$ gears. For reverse, fluid flows from ECU 52, through passage 135, through reverse valve 74, displacing the shuttle valve 136 to communicate with the second clutch C2 for reverse operation. Therefore the reverse valve 74 controls the pressure in the second clutch during reverse.

The following describes the interconnection between the rest of the torque transmitting devices and the electro-hydraulic control system 50. The first clutch C1 is connected to port 84N. The third clutch C3 is connected to port 84O. The apply portion of the first control brake B1 (L/R B apl) is connected to port 84R, and the reduce portion of the brake B1 is directly connected to the ECU through the drive passage 102. The second control brake B2 is connected to port 84Q of shift valve 84.

S1 Valve

The solenoid control valve 86, as previously mentioned, is an off-on solenoid valve. The valve 86 is operable to establish the pressure in the passage 87. The passage 87 is fed from the passage 96 through an orifice or restriction 138. In the off position shown, the control valve 86 connects the passage 87 to exhaust such that the pressure in the passage is low and not sufficient to move the shift valve 84 from the spring set position since the orifice 138 restricts the inflow while the outflow through control valve 86 is not restricted. In the on position, the control valve 86 blocks the outflow from passage such that the pressure in the passage 87 rises to a level sufficient to move the shift valve 84 to the pressure set position.

The control valve 90, as previously mentioned, is an off-on solenoid valve. The valve 90 is operable to establish the pressure in the passage 91. The passage 91 is fed from the passage 96 through an orifice or restriction 140. In the off position shown, the control valve 90 connects the passage 91 to exhaust such that the pressure in the passage is low and not sufficient to move the shift valve 88 off the spring set position since the orifice 140 restricts the inflow while the outflow through control valve 90 is not restricted. In the on position, the control valve 90 blocks the outflow from passage such that the pressure in the passage 91 rises to a level sufficient to move the shift valve 88 to the pressure set position.

The control valve 94, as previously mentioned, is an off-on solenoid valve. The control valve 94 is operable to establish the pressure in the passage 95. The passage 95 is fed from the passage 96 through an orifice or restriction 142. In the off position shown, the control valve 94 connects the passage 95 to exhaust such that the pressure in the passage is low and not sufficient to move the shift valve 92 from the spring set position since the orifice 142 restricts the inflow while the outflow through control valve 94 is not restricted. In the on position, the control valve 94 blocks the outflow from passage such that the pressure in the passage 95 rises to a level sufficient to move the shift valve 92 to the pressure set position.

The manual valve, not shown, in the control 52 is a conventional directional valve that can be manipulated by the operator to a plurality of positions including park, reverse, neutral, and a plurality of forward drive conditions. A passage 146 is connected to main line pressure at the control 52. The passage 146 is connected between the control 52 and the port 92M. The drive passage 102 is connected with main line pressure, the maximum pressure in the system, in the control 52 when the manual valve is placed in the drive positions. The passage 135 is connected between the control 52 and the reverse control valve 74 during reverse operation.

Operation

In park, reverse, and neutral, the control valve 90 is actuated to place the shift valve 88 in the pressure set position thus delivering line pressure from the ECU in passage 146 to apply the first control brake B1. In park and neutral, the pressure control valve 72 is set to maximum and the pressure control valve 70 is set to exhaust. This ensures that the reverse clutch C2 is exhausted. When reverse is selected by the operator, the pressure control valve 72 is controlled in a modulating condition to thereby control the pressure output of the reverse valve 74 such that the torque transmitting mechanism C2 is engaged at a controlled rate.

During a neutral to first shift, there are two possible first ratio selections, automatic and manual. During automatic selection, the one-way mechanism RI provides drive reaction. The shift valves 84 and 92 are in the spring set position and the shift valve 88 is in the pressure set position. The pressure control valve 72 is set at maximum pressure output and the pressure control valve 70 is controlled to provide a modulated pressure. The output pressure from the high ratio control valve 62 is directed through the S/T SW VALVE 112 and shift valves 92, 88, and 84 to the torque transmitting mechanism C1 which is engaged at a rate controlled by the output pressure of the high ratio control 62. When the first ratio has been completed, both of the pressure control valves 70 and 72 are set to exhaust. During manual low gear, not illustrated in FIG. 3, the passage 146 is line pressurized and is directed through the shift valves 92, 88, and 84 to pressurize the apply piston of the torque transmitting mechanism B1. Brake B1 in conjunction with the one way mechanism R1 ensure engine coast braking is present. There is no drive pressure in passage 102 in manual low gear.

During a first to second (1-2), first to third (1-3), or second to third (2-3) ratio interchange, the shift valves 84, 88, and 92 are spring set, while the S/T valve 112 is pressure set. During a 1-2 interchange, the pressure control valve 70 is exhausted and the pressure control valve 72 is modulated. The output pressure from the low ratio control valve 68 is directed through valves 112, 88, and 84 to the torque transmitting mechanism B2. When the torque transmitting mechanism B2 reaches the critical capacity, the one-way mechanism R1 releases and the second forward ratio is established. When the second ratio has been established, the shift valves 84, 88, and 92 remain in the spring set position and the S/T valve 112 is shifted back to the spring set position. The torque transmitting mechanism B2 is maintained in the engaged condition by pressure from the drive passage 102 through the D5/EX SW VALVE 82, the S/T valve 112, through the low pressure port 112K, and through the shift valves 88 and 84. The pressure control valves 70 and 72 are both set to exhaust.

During a 1-3 interchange, the pressure control valve 70 is modulated and the pressure control valve 72 is exhausted. The output pressure of the high ratio control valve 62 is directed through the S/T valve 112, and shift valves 92 and 88 to the torque transmitting mechanism C2 which is engaged at a controlled rate. When the torque transmitting mechanism C2 reaches the critical capacity, the one-way mechanism R1 releases and the third forward ratio is achieved. When the third forward ratio is fully established, the S/T valve 112 is released to the spring set position and the torque transmitting mechanism C2 is maintained engaged by pressure from drive passage 102 through the D5/EX SW VALVE 82, the S/T valve 112, and switch valves 92 and 88. The pressure control valves 70 and 72 are both set to exhaust.

During a 2-3 interchange, both pressure control valves 70 and 72 are modulated. The low pressure control valve 70 is modulated from low pressure to high pressure while the high pressure control valve 72 is modulated from high pressure to low pressure. The pressure output of the low ratio control valve 68 is directed to the torque transmitting mechanism B2 through the S/T valve 112, and shift valves 88 and 84. The pressure output of the high ratio control valve 62 is directed through the S/T valve 112, and shift valves 92 and 88 to the torque transmitting mechanism C2. The output pressure of the high ratio control valve 62 is also imposed on the control port 68B of the low ratio control valve 68. When the torque transmitting mechanism C2 reaches the critical capacity to transmit the required torque, the low ratio control valve 68 is set to exhaust by the pressure bias at port 68B from the high ratio control valve 62. When the third forward ratio is fully established, the S/T valve 112 is set to the pressure set position and the torque transmitting mechanism C2 is maintained engaged by pressure from drive passage 102 through the D5/EX SW VALVE 82, the S/T valve 112, and shift valves 92 and 88. The pressure control valves 70 and 72 are both set to exhaust. During a 3-2 downshift, the DOWN SHIFT VALVE 126 is pressurized form the solenoid valve 128 such that the control ports 66B and 68B are disconnected from the passages 122 and 132. The control valve 68 will be controlled to output pressure from a low value to a high value while the pressure from the control valve 62 will be decreased from high pressure to exhaust. The DOWN SHIFT VALVE 126 blocks the initial high pressure output of the control valve 62 from the control port 68B

During a second to fourth (2-4) interchange, the shift valve 92 is pressure set and the shift valves 84 and 88 are spring set. The pressure control valves 70 and 72 are both modulated. The pressure control valve 70 increases the pressure output thereof and the pressure control valve 72 decreases the pressure output thereof. The pressure output of the low ratio control valve 68, as controlled by the pressure control valve 72, is directed to the torque transmitting mechanism B2 through the S/T valve 112, and shift valves 88 and 84. Since the pressure output of the low ratio control valve 68 starts high and goes low, the torque transmitting mechanism B2 is maintained engaged during the initial portion of the 2-4 interchange. Since the output pressure of the high ratio control valve 62 starts low and goes high, the pressure at the torque transmitting mechanism C3 as delivered through the S/T valve 112 and shift valve 92 is increased at a controlled rate. When the pressure in the torque transmitting mechanism C3 is sufficient to establish the critical capacity at the torque transmitting mechanism C3, the pressure in the passage 132 operating at the control port 68B of the low ratio control valve 68 causes the output pressure thereof to be exhausted and the torque transmitting mechanism B2 will be released or disengaged. When the fourth ratio is fully established, the shift valve 88 is moved to the pressure set position and both of the pressure control valves 70 and 72 are set to exhaust. The torque transmitting mechanism B2 is exhausted through the shift valves 84 and 88 to the passage 144 such that a minimum pressure is maintained thereat. The torque transmitting mechanism C3 is maintained engaged by pressure from the passage 102 through the D5/EX SW VALVE 82, the S/T valve 112, and shift valve 92. The torque transmitting mechanism C1 is maintained engaged by pressure from. the passage 102 through the shift valves 92, 88, and 84. During a 4-2 down shift, the DOWN SHIFT VALVE 126 is effective to prevent the high ratio control valve 62 from imposing a control pressure on the low ratio control valve 68.

During a third to fourth (3-4) interchange, the shift valves 88 and 92 are moved to the pressure set position. Both of the pressure control valves 70 and 72 are modulated. The pressure output of the pressure control valve 72 is modulated from high to low and the pressure output of the pressure control valve 70 is modulated from low to high. The torque transmitting mechanism C1 is maintained engaged through the interchange by pressure from the passage 102 through the shift valves 92, 88, and 84. The torque transmitting mechanism C2 is controlled by the pressure output from the low ratio control valve 66 and the torque transmitting mechanism C3 is controlled by the pressure output from the high ratio control valve 62. The pressure output of the low ratio control valve 66 is modulated downward and the pressure output of the high ratio control valve 62 is modulated upward.

The pressure output of the low ratio control valve 66 is directed by the S/T valve 112, and shift valves 92 and 88 to the torque transmitting mechanism C2 to control the disengagement thereof. The pressure output of the high ratio control valve 62 is directed through the S/T valve 112, and shift valves 92 and 84 to the torque transmitting mechanism C3 to control the engagement thereof. When the torque transmitting mechanism C3 is pressurized to the critical torque capacity, the pressure from the high ratio control valve 62 in passage 104, operating on the control port 66B will cause the low ratio control valve 66 to exhaust the pressure in the passage 108 and therefore the torque transmitting mechanism C2 when the critical capacity of the on-coming friction device is achieved. When the fourth ratio is fully established, the shift valve 84 remains in the spring set position and the shift valves 88 and 92 remain pressure set, while both of the pressure control valves 70 and 72 are set to exhaust. The torque transmitting mechanism C3 is maintained engaged by pressure from the passage 102 through the D5/EX SW VALVE 82, the S/T valve 112, and shift valve 92. The torque transmitting mechanism C1 is maintained engaged by pressure from the passage 102 through the shift valves 92, 88, and 84. During a 4-3 down shift, The DOWN SHIFT VALVE 126 is effective to prevent a control pressure from the high ratio control valve 62 from imposing a control pressure on the low ratio control valve 66.

During a third to fifth (3-5) interchange, the shift valves 84 and 92 are moved to the pressure set position. Both of the pressure control valves 70 and 72 are modulated. The pressure output of the pressure control valve 72 is modulated from high to low and the pressure output of the pressure control valve 70 is modulated from low to high. The torque transmitting mechanism C2 is maintained engaged through the interchange by pressure from the passage 102 through the shift valves 84, 92, and 88. The torque transmitting mechanism C1 is controlled by the pressure output from the low ratio control valve 68 and the torque transmitting mechanism C3 is controlled by the pressure output from the high ratio control valve 64. The pressure output of the low ratio control valve 68 is modulated downward and the pressure output of the high ratio control valve 64 is modulated upward. The pressure output of the low ratio control valve 68 is directed by the S/T valve 112, and shift valves 88, 92 and 84 to the torque transmitting mechanism C1 to control the disengagement thereof. The pressure output of the high ratio control valve 64 is directed through the S/T valve 112, and shift valves 88, 92 and 84 to the torque transmitting mechanism C3 to control the engagement thereof. When the torque transmitting mechanism C3 is pressurized to the critical torque capacity, the pressure from the high ratio control valve 64 in passage 106, operating on the control port 68B causes the low ratio control valve 68 to exhaust the pressure in the passage 110 and therefore the torque transmitting mechanism C1. When the fifth ratio is fully established, the shift valve 88 remains in the spring set position and the shift valves 84 and 92 remain pressure set, while both of the pressure control valves 70 and 72 are set to exhaust. The torque transmitting mechanism C3 is maintained engaged by pressure from the passage 102 through the D5/EX SW VALVE 82, the S/T valve 112, and shift valves 88, 92, and 84. The torque transmitting mechanism C2 is maintained engaged by pressure from the passage 102 through the shift valves 84, 92, and 88. During a 5-3 downshift, the DOWN SHIFT VALVE 126 prevents the high ratio control valve 64 from imposing a control bias on the low ratio control valve 68.

During a fourth to fifth (4-5) interchange, the shift valve 84 is moved to the pressure set position, while shift valves 88 and 92 are spring set. Both of the pressure control valves 70 and 72 are modulated. The pressure output of the pressure control valve 72 is modulated from high to low and the pressure output of the pressure control valve 70 is modulated from low to high. The torque transmitting mechanism C3 is maintained engaged through the interchange by pressure from the passage 102 through the shift valves 92 and 84. The torque transmitting mechanism C1 is controlled by the pressure output from the low ratio control valve 66 and the torque transmitting mechanism C2 is controlled by the pressure output from the high ratio control valve 62. The pressure output of the low ratio control valve 66 is modulated downward and the pressure output of the high ratio control valve 62 is modulated upward. The pressure output of the low ratio control valve 66 is directed by the S/T valve 112, and shift valves 92 and 84 to the torque transmitting mechanism C1 to control the disengagement thereof. The pressure output of the high ratio control valve 62 is directed through the S/T valve 112, and shift valves 92 and 88 to the torque transmitting mechanism C2 to control the engagement thereof. When the torque transmitting mechanism C2 is pressurized to the critical torque capacity, the pressure from the high ratio control valve 62 in passage 104, operating on the control port 66B causes the low ratio control valve 66 to exhaust the pressure in the passage 108 and therefore the torque transmitting mechanism C1. When the fifth ratio is fully established, the shift valve 88 remains in the spring set position and the shift valves 84 and 92 remain pressure set, while both of the pressure control valves 70 and 72 are set to exhaust. The torque transmitting mechanism C3 is maintained engaged by pressure from the passage 102 through the D5/EX SW VALVE 82, the S/T valve 112, and shift valves 88, 92, and 84. The torque transmitting mechanism C2 is maintained engaged by pressure from the passage 102 through the shift valves 84, 92, and 88. During a 5-4 downshift, the DOWN SHIFT VALVE 126 will prevent the output pressure of the high ratio control valve 62 from imposing a bias on the low ratio control valve 66. Thus permitting the low ratio control valve 66 to control the oncoming torque transmitting mechanism C1.

During a fourth to sixth (4-6) interchange, the shift valves 84 and 88 are moved to the pressure set position, while shift valve 92 is spring set. Both of the pressure control valves 70 and 72 are modulated. The pressure output of the pressure control valve 72 is modulated from high to low and the pressure output of the pressure control valve 70 is modulated from low to high. The torque transmitting mechanism C3 is maintained engaged through the interchange by pressure from the passage 102 through the shift valves 92 and 84. The torque transmitting mechanism C1 is controlled by the pressure output from the low ratio control valve 66 and the torque transmitting mechanism B2 is controlled by the pressure output from the high ratio control valve 62. The pressure output of the low ratio control valve 66 is modulated downward and the pressure output of the high ratio control valve 62 is modulated upward. The pressure output of the low ratio control valve 66 is directed by the S/T valve 112, and shift valves 92 and 84 to the torque transmitting mechanism C1 to control the disengagement thereof. The pressure output of the high ratio control valve 62 is directed through the S/T valve 112, and shift valves 88 and 84 to the torque transmitting mechanism B2 to control the engagement thereof. When the torque transmitting mechanism B2 is pressurized to the critical torque capacity, the pressure from the high ratio control valve 62 in passage 104, operating on the control port 66B causes the low ratio control valve 66 to exhaust the pressure in the passage 108 and therefore the torque transmitting mechanism C1. When the sixth ratio is fully established, the shift valves 84 and 88 remain in the pressure set position and the shift valve 92 moves to the pressure set position, while both of the pressure control valves 70 and 72 are set to exhaust. The torque transmitting mechanism C1 is exhausted through the shift valves 84, 92 and 88 to the passage 144 such that a minimum pressure is maintained thereat. The torque transmitting mechanism B2 is maintained engaged by pressure from the drive passage 102 through the D5/EX SW VALVE 82, the S/T valve 112, and shift valves 88 and 84. The torque transmitting mechanism C3 is maintained engaged by pressure from the passage 102 through the shift valves 88, 92, and 84. During a 6-4 downshift, the DOWN SHIFT VALVE 126 will prevent the high ratio control valve 62 from imposing a bias at the port 66B of the low ratio control valve 66.

During a fifth to sixth (5-6) interchange, all the shift valves 84, 88 and 92 are moved to the pressure set position. Both of the pressure control valves 70 and 72 are modulated. The pressure output of the pressure control valve 72 is modulated from high to low and the pressure output of the pressure control valve 70 is modulated from low to high. The torque transmitting mechanism C3 is maintained engaged through the interchange by pressure from the passage 102 through the shift valves 88, 92, and 84. The torque transmitting mechanism C2 is controlled by the pressure output from the low ratio control valve 66 and the torque transmitting mechanism B2 is controlled by the pressure output from the high ratio control valve 62. The pressure output of the low ratio control valve 66 is modulated downward and the pressure output of the high ratio control valve 62 is modulated upward. The pressure output of the low ratio control valve 66 is directed by the S/T valve 112, and shift valves 92 and 88 to the torque transmitting mechanism C2 to control the disengagement thereof. The pressure output of the high ratio control valve 62 is directed through the S/T valve 112, and shift valves 88 and 84 to the torque transmitting mechanism B2 to control the engagement thereof. When the torque transmitting mechanism B2 is pressurized to the critical torque capacity, the pressure from the high ratio control valve 62 in passage 104, operating on the control port 66B causes the low ratio control valve 66 to exhaust the pressure in the passage 108 and therefore the torque transmitting mechanism C2. When the sixth ratio is fully established, the shift valves 84 and 88 remain in the pressure set position and the shift valve 92 moves to the pressure set position, while both of the pressure control valves 70 and 72 are set to exhaust. The torque transmitting mechanism B2 is maintained engaged by pressure from the passage 102 through the D5/EX SW VALVE 82, the S/T valve 112, and shift valves 88 and 84. The torque transmitting mechanism C3 is maintained engaged by pressure from the passage 102 through the shift valves 88, 92, and 84. During a 6-5 downshift, the DOWN SHIFT VALVE 126 is shifted by the valve 128 to block the output pressure of the high ratio shift valve 62 from acting on the control port 66B of the low pressure control valve 66.

During a 1-2, 1-3, 2-3, and 2-4 upshift and the steady state second and third ratios, the apply chamber of the torque transmitting mechanism B1 is exhausted to the passage 144 through the shift valves 84 and 88. During a 3-5, 4-5, 4-6, and 5-6 upshift and the steady state fifth and sixth ratios, the apply chamber of the torque transmitting mechanism B1 is exhausted to the passage 144 through the shift valve 84. During the 3-4 upshift, the apply chamber is exhausted to the passage 144 through shift valves 84, 88, and 92. The shift logic valves 84, 88 and 92 will be set to the position as defined in the table based on which shift is commanded. The S/T SW VALVE 112 is set at pressured position, except during the 1-2 and 1-3 upshift, The DOWN SHIFT VALVE 126 is set at spring position. The pressure control valve 72 which controls the off going torque transmitting mechanism (low gear torque transmitting mechanism) is set at the level as a function of the transmission input torque. The pressure control valve 70 which controls oncoming torque transmitting mechanism (high gear torque transmitting mechanism) will be commanded from low to high to engage the corresponding coming torque transmitting mechanism. The oncoming torque transmitting mechanism pressure is introduced to the ports 66B and 68B through the DOWN SHIFT VALVE 126. As the coming torque transmitting mechanism pressure reach to its critical capacity, the output pressure of the low gear torque transmitting mechanism pressure control valve will be reduced to zero, therefore, the off going torque transmitting mechanism will be disengaged. As the shift is completed, the output pressure of the high gear torque transmitting mechanism control valves will be high, and the output pressure of the low gear torque transmitting mechanism control valves will be low. Therefore, the D5/EX SW VALVE 82 will be at lower position. When the shift is completed, the S/T SW VALVE 112 will be switched to spring position. Since the D5/EX SW VALVE 82 already at lower position, the oncoming torque transmitting mechanism (high gear torque transmitting mechanism) will be fed be the pressure in passage 102, and the off going torque transmitting mechanism (low gear torque transmitting mechanism) will be connected to the 2 psi back fill pressure.

During downshifting, the low ratio control valves are maintained with a higher control pressure from the pressure control valve 72 such that the pressure output of the high ratio control valves will not cause the low ratio control valves to exhaust. The interchange timing is not as critical during a downshift since the speed of the engine must be permitted to increase in any event. The shift valves 84, 88 and 92 will be set to the position as defined in the table based on which shift is commanded. The S/T SW VALVE 112 is set at pressured position. Except during the 2-1 and 3-1 downshifts, the DOWN SHIFT VALVE 126 is set at pressured position. The pressure control valve 72 which controls the oncoming torque transmitting mechanism (low gear torque transmitting mechanism) is commanded from low to high. The pressure control valve 70 which controls off going torque transmitting mechanism (high gear torque transmitting mechanism) will be commanded from high to low. As the shift is completed, the output pressure of the high gear torque transmitting mechanism control valves will be low, and the output pressure of the low gear torque transmitting mechanism control valves will be high. Therefore, the D5/EX SW VALVE 82 will be at upper position. When the shift is completed, the S/T SW VALVE 112 will be switched to spring position. Since the D5/EX SW VALVE 82 already at upper position, the oncoming torque transmitting mechanism (low-gear torque transmitting mechanism) will be fed be the D5 pressure, and the off going torque transmitting mechanism (high gear torque transmitting mechanism) will be connected to the 2 psi back fill pressure.

The truth table shown in FIG. 3 sets forth the condition of the torque transmitting mechanisms and the engagement pressure applied thereto during the ratio interchanges and the steady state conditions. A blank space indicates that the torque transmitting mechanism is disengaged. The table also shows the operating condition of the shift valves 84, 88, and 92, the S/T control valve 114, and the valves 114 and 128 during the ratio interchanges and the steady state conditions. From the above description, it should now be appreciated by those skilled in the art that during upshift ratio interchanges, the S/T valve directs ratio controlled pressure to the on-coming and off-going friction devices; while during steady state ratios, the S/T valve directs fixed pressure to the engaged friction devices.

The foregoing description of the preferred embodiment of the invention has been presented for the purpose of illustration and description. It is not intended to be exhaustive, nor is it intended to limit the invention to the precise form disclosed. It will be apparent to those skilled in the art that the disclosed embodiment may be modified in light of the above teachings. The embodiment was chosen to provide an illustration of the principles of the invention and its practical application to thereby enable one of ordinary skill in the art to utilize the invention in various embodiments and with various modifications as are suited to the particular use contemplated. Therefore, the foregoing description is to be considered exemplary, rather than limiting, and the true scope of the invention is that described in the following claims.

What is claimed is:

1. A control mechanism for a multi-speed transmission having a plurality of selectively engageable torque transmitting mechanisms, said control mechanism comprising:
   a source of fluid pressure;
   first, second, and third shift valve means having a spring set position and a pressure set position and being positionable to distribute fluid to and from the torque transmitting mechanisms according to a predetermined schedule to establish six forward ratios in the multi-speed transmission;
   switching valve means having a spring set position for steady state operation and a pressure set position for transient operation and for distributing fluid to said shift valve means during the steady state and transient operations;
   high ratio control valve means disposed in fluid communication with said source for distributing fluid pressure, in accordance with the predetermined schedule, to said switching valve means to effect an increasing pressure change in an oncoming one of said torque transmitting mechanisms during an upshift ratio change transient operation;
   low ratio control valve means disposed in fluid communication with said source for distributing fluid pressure, in accordance with the predetermined schedule, to said switching valve means to effect a decreasing pressure change in an off going one of said torque transmitting mechanisms during an upshift ratio change transient operation; and
   downshift valve means for directing said pressure distributed by said high ratio control valve means to a bias port on said low ratio control valve means to discontinue pressure distribution therefrom when said increasing pressure achieves a predetermined level.

2. The control mechanism defined in claim 1 further comprising:
   an exhaust switching valve means disposed for fluid communication with a high pressure passage and a low pressure passage and having a first pressure set position for distributing fluid in the high pressure passage to a first port on said switching valve means and for distributing fluid from a second port on said switching valve means to the low pressure passage, and a second pressure set position for distributing fluid from said first port on said switching valve means to the low pressure passage and for distributing fluid in said high pressure passage to said second port on said switching valve means; and
   said switching valve means being effective in said spring set position to distribute the fluid from said high pressure passage to one of said torque transmitting mechanisms to maintain said torque transmitting mechanism engaged, and being effective to connect another of said torque transmitting mechanisms connected with said low pressure passage.

3. The control mechanism defined in claim 2 further comprising:
   said shift valve means being effective to communicate a further of the torque transmitting mechanisms not connected with said switching valve means and to communicate said exhaust switching valve means with the low pressure passage with the high pressure passage and communicate the remaining two torque transmitting mechanisms with the low pressure passage.

4. The control mechanism defined in claim 2 further wherein:
   said exhaust switching valve means being urged in said first pressure set position by fluid pressure from said high ratio control valve means and to said second pressure set position by fluid pressure from said low ratio control valve means.

5. The control mechanism defined in claim 1 further wherein:
   said downshift valve means having a spring set position during upshift interchanges and a pressure set position during downshift interchanges and being effective in said pressure set position to prevent pressure distribution from said high ratio control valve means to said bias port.

6. A control mechanism for a multi-speed transmission having a plurality of selectively engageable torque transmitting mechanisms, said control mechanism comprising:
   a source of fluid pressure;
   first, second, and third shift valve means having a spring set position and a pressure set position and being positionable to distribute fluid to and from the torque transmitting mechanisms according to a predetermined schedule to establish six forward ratios in the multi-speed transmission;
   switching valve means having a spring set position for steady state operation and a pressure set position for transient operation, said switching valve means distributing fluid to said shift valve means during the steady state and transient operations;
   high ratio control valve means disposed in fluid communication with said source for distributing fluid pressure, in accordance with the predetermined schedule, to said switching valve means to effect an increasing pressure change in an oncoming one of said torque transmitting mechanisms during an upshift ratio interchange transient operation, and to effect a decreasing pressure change in an off-going one of said torque transmitting mechanisms during a downshift ratio interchange transient operation;

low ratio control valve means disposed in fluid communication with said source for distributing fluid pressure, in accordance with the predetermined schedule, to said switching valve means to effect a decreasing pressure change in an off going one of said torque transmitting mechanisms during an upshift ratio interchange transient operation, and to effect an increasing pressure change in an on coming one of said torque transmitting mechanisms during an downshift ratio interchange transient operation; and downshift valve means for directing said pressure distributed by said high ratio control valve means to a bias port on said low ratio control valve means to discontinue pressure distribution therefrom when said increasing pressure achieves a predetermined level during an upshift ratio interchange, and for blocking pressure distribution to said bias port during a downshift ratio interchange.

7. The control mechanism defined in claim 6 further comprising:

an exhaust switching valve means disposed for fluid communication with a high pressure passage communicating with said source and a low pressure passage communicating with a reservoir through a backfill regulator valve and having a first pressure set position for distributing fluid in the high pressure passage to a first port on said switching valve means and for distributing fluid from a second port on said switching valve means to the low pressure passage, and a second pressure set position for distributing fluid from said first port on said switching valve means to the low pressure passage and for distributing fluid in said high pressure passage to said second port on said switching valve means;

said switching valve means being effective in said spring set position to distribute the fluid from said high pressure passage to one of said torque transmitting mechanisms to maintain said torque transmitting mechanism engaged, and being effective to connect another of said torque transmitting mechanisms connected with said low pressure passage.

\* \* \* \* \*